(12) United States Patent
Hwang

(10) Patent No.: US 12,520,271 B2
(45) Date of Patent: Jan. 6, 2026

(54) PROVIDING LOCATION INFORMATION SERVICE REMOTELY

(71) Applicant: Ryong Hwang, Seoul (KR)

(72) Inventor: Ryong Hwang, Seoul (KR)

(73) Assignee: Ryong Hwang, Seoul (KR)

( * ) Notice: Subject to any disclaimer, the term of this patent is extended or adjusted under 35 U.S.C. 154(b) by 401 days.

(21) Appl. No.: 18/112,997

(22) Filed: Feb. 22, 2023

(65) Prior Publication Data

US 2024/0284394 A1   Aug. 22, 2024

(51) Int. Cl.
*H04W 64/00* (2009.01)
*H04N 21/2187* (2011.01)

(52) U.S. Cl.
CPC ...... *H04W 64/003* (2013.01); *H04N 21/2187* (2013.01)

(58) Field of Classification Search
CPC ..... H04W 64/003; H04W 4/02; H04W 4/029; H04W 4/44; H04W 4/024; H04W 64/00; H04W 92/18; H04W 4/025; H04W 72/25; H04W 4/08; H04W 72/1263; H04W 4/60; H04W 12/72; H04W 74/00; H04W 12/069; H04W 12/77; H04W 28/0205; H04W 4/023; H04W 8/20; H04W 8/24; H04W 12/63; H04W 72/51; H04N 21/2187; H04N 1/00307; H04N 2201/3247; H04N 2201/0096; H04N 7/163; H04N 21/41407; H04N 21/4223; H04N 2201/3226; H04N 1/32101; H04N 2201/3205; H04N 1/00342; H04N 21/8549; H04N 21/4316; H04N 2201/3253; H04N 7/15; H04N 7/165; H04N 2101/00; G06T 7/70; G06T 2210/04; G06T 7/74; G06T 2207/30244; G06T 2207/20084; G06T 11/00; G06T 2207/20081; G06T 7/00; G06T 7/246; G06T 15/005; G06T 2207/30252; G06T 7/60; G06T 2207/10004; G06T 2207/10016; G06T 2207/10032; G06T 2207/10048; G06T 2207/30181; G06T 3/4038; G06T 7/11; G06T 7/62; G06T 9/002; G06T 2207/30232; G06T 7/0002; G06T 7/55; G06T 7/80; G06T 7/97; G06T 7/001; G06T 2207/2084; G06T 7/215; G06T 19/00; G08G 5/55; G08G 5/21; G08G 5/26; G08G 5/57; G08G 1/205; G08G 1/005; G08G 1/0969; G08G 5/76; G08G 1/202; G08G 5/22; G08G 5/25;

(Continued)

(56) References Cited

U.S. PATENT DOCUMENTS

2017/0064357 A1\*   3/2017   Jabara ................... H04W 4/14
2017/0068424 A1\*   3/2017   Hong .................... H04N 13/30

(Continued)

*Primary Examiner* — Nimesh Patel
(74) *Attorney, Agent, or Firm* — Fresh IP PLC; Clifford D. Hyra; Aubrey Y. Chen

(57) ABSTRACT

A method of providing a location information service is disclosed. The present disclosure provides a real-time video streaming service through a device capable of providing a video service at a remote location at the request of a remote user. In addition, additional missions are allowed to be performed in addition to a simple video service at the request of a remote user such that a customized location-based service is provided by reflecting a request of the user in real time at a remote location.

12 Claims, 18 Drawing Sheets

(58) Field of Classification Search
CPC .......... G08G 5/50; G08G 1/137; G08G 1/00;
G08G 1/0133; G08G 1/096775; G08G
1/127; G08G 1/13; G08G 1/144; G08G
5/00; G06N 20/00; G06N 3/08; G06N
3/0464; G06N 5/01; G06N 3/045; G06N
5/022; G06N 3/04; G06N 3/098; G01S
19/01; G01S 5/14; G01S 2205/01; G01S
5/02; G01S 17/89; G01S 17/42; G01S
5/0284; G01S 5/0247; G01S 19/42; G01S
17/894; G01S 5/06; B64U 2201/20;
B64U 2201/10; B64U 2101/30; B64U
50/38; B64U 2101/00; B64U 10/17;
B64U 20/40; B64U 20/50; B64U 70/80;
B64U 70/92; B64U 80/60; B64U
2101/24; B64U 80/82; H04M 1/21;
H04M 1/72409; H04M 7/0015; H04M
1/72442; H04M 3/53333; H04M 1/72427;
H04M 2250/10; H04M 2250/52; H04M
1/0254; H04M 1/72457; G06F 21/34;
G06F 9/451; G06F 2203/0384; G06F
3/1292; G06F 16/29; G06F 21/36; G06F
21/43; G06Q 50/01; G06Q 20/325; G06Q
50/10; G06Q 20/32; G06Q 30/0267;
G06Q 10/02; G06Q 20/3276; H04L
12/189; H04L 9/3247; H04L 67/04; H04L
27/26; H04L 27/2601; H04L 5/0007;
H04L 63/0861; H04L 2209/80; H04L
63/10; H04L 65/1094; H04L 69/14; H04L
9/0866; H04L 9/0863; H04L 9/40; G06V
20/52; G06V 20/20; G06V 20/00; G06V
40/10; G06V 20/64; G06V 10/82; G06V
20/10; G06V 10/17; G06V 20/44; G06V
20/17; G06V 2201/07; G06V 10/764;
G06V 10/255; Y02D 30/70
See application file for complete search history.

(56) References Cited

U.S. PATENT DOCUMENTS

| | | | |
|---|---|---|---|
| 2017/0193308 A1* | 7/2017 | Buyse | G08B 21/0446 |
| 2017/0277176 A1* | 9/2017 | Hutson | G06F 3/0338 |
| 2017/0347129 A1* | 11/2017 | Levi | H04N 21/4122 |
| 2018/0160153 A1* | 6/2018 | Rajewski | H04N 21/4185 |
| 2018/0194455 A1* | 7/2018 | Park | G06V 20/17 |
| 2020/0038764 A1* | 2/2020 | Perlman | H04N 21/2385 |

* cited by examiner

FIG. 8

| ID | On/Off | Location | User Number |
|---|---|---|---|
| | | Subscribed Walking Man | |
| WM1 | On | ITALY, Rome | 3.1 |
| WM2 | On | FRANCE | 1.3 |
| | | : | |
| WMn | OFF | | |

FIG. 9

| ID | Location | User | Streaming |
|---|---|---|---|
| WM1 | Vatican | 1.1 | |
| WM2 | Pantheon | 0.6 | |
| WM3 | Fontana di Trevi | 2.5 | |

Live Walking Man

PROVIDING LOCATION INFORMATION SERVICE REMOTELY

BACKGROUND

Field

The present disclosure relates to a location information service providing method.

Related Art

With the recent evolution of information and communication technology, demand for remote service markets is gradually increasing. In particular, due to the recent COVID-19 situation, consumers' interest in untact markets and service supply of markets for untact services are also explosively increasing. In addition, apart from the COVID-19 situation, the demand and supply markets for remote services are gradually expanding.

In particular, it is necessary to develop an item that remotely provides location information to consumers who cannot enjoy various services for specific location information due to time constraints and spatial restrictions.

SUMMARY

An object of the present disclosure is to provide a real-time location-related service while overcoming space-time constraints through a user terminal capable of providing mobile applications and location-related services.

An object of the present disclosure is to disclose a new type of business model between real-time location-related service consumers, location-related service providers, platform operators, and/or advertisement providers that provide additional services along with location-related services through a communication network.

The objects to be achieved by the present disclosure are not limited to the above-mentioned objects, and other objects not mentioned may be clearly understood by those skilled in the art from the following description.

A method of providing a location information service according to an embodiment of the present disclosure may be provided through an application for location information service provision. The method of providing a location information service includes displaying location information of a registered first device on a map, transmitting a request for providing location information to the first device through a wireless communication unit when the request for providing location information is received through the first device from a second user of a second device through the wireless communication unit, receiving an image captured by the first device through the wireless communication unit and transmitting the image to the second device, providing a messenger window for requesting a predetermined mission to a first user of the first device when the second user is a paid member of the application, and providing points according to execution of the mission to the first user upon determining that the mission has been performed in response to the request of the second user.

The first device may include at least one of a wearable device wearable by the first user, an unmanned aerial vehicle controllable by the first user, a portable terminal of the first user capable of wirelessly controlling the wearable device, and a portable terminal of the first user capable of wirelessly controlling the unmanned aerial vehicle.

The displaying of the location information of the first device on the map includes searching for at least one first device matching a location on a map displayed on a display of the second device, and displaying a graphic object capable of indicating each of the at least one first device on the map.

The method of providing a location information service may further include differentially managing a grade of the first user through a database on the basis of at least one of a number of requests for providing the location information from the first user, a number of times the mission is requested, a number of times the mission is performed, a degree of responsiveness of the second user according to execution of the mission, types of missions that are able to be performed by the first user, and a difficulty level, wherein the graphic object may be changed according to the grade of the first user.

In the method of providing a location information service, a standby state may be displayed through the graphic object when the first device is performing the predetermined mission in response to a request of the paid member.

The method of providing a location information service may further include transmitting an alarm to the first device and a first user terminal capable of wirelessly controlling the first device when acknowledgement for the request for providing location information is not received from the first device within a predetermined time.

The displaying of the location information of the first device on the map may include displaying the location information of the first device on the map if the first device is registered in a standby state for providing the location information service at a specific location before the specific location is displayed through the map.

The method of providing a location information service may further include generating and displaying a group messenger window having a plurality of second users as participants when the number of second users requesting the predetermined mission through the messenger window exceeds a predetermined number, wherein the user of the first device has the right to control the group messenger window.

The method of providing a location information service may further include extracting and blurring a face area of a person if an object included in the image captured by the first device is the person.

The method of providing a location information service may further include controlling region-based advertisement content to be displayed on the display of the second device based on the location information of the first device.

The advertisement content may be changed according to the grade of the first user and whether or not the second user is a paid member.

The messenger window may include a control right setting menu for the first device, and the method of providing a location information service may further include granting a control right to control a camera direction of the first device to the second user through an input signal applied to the control right setting menu, and transmitting a camera control signal for controlling the camera direction of the first device to the first device based on a touch signal input to the display of the second device.

A method of providing a location information service according to another embodiment of the present disclosure includes displaying a map including a specific location and displaying, on the map, at least one first device whose actual location is matched on the map, when at least one of the at least one first device is selected, displaying an image acquired through a camera of the selected first device on a display, displaying a messenger window for requesting a predetermined mission from a first user of the first device on the display when a user of the application is a paid member, and transmitting a control signal for requesting execution of a specific mission to the first device through an input of the messenger window.

The displaying of the at least one first device on the map may include displaying a graphic object indicating the first device differently according to a grade of the first user, and the grade of the first user may be managed differently according to at least one of a number of requests for providing the location information from the first user, a number of times the mission is requested, a number of times the mission is performed, a degree of responsiveness of a mission execution requester, types of missions that are able to be performed by the first user, and a difficulty level.

The messenger window may include at least one of a touch input interface, a voice input interface, and an image input interface, and the method of providing a location information service may further include requesting the mission through the interface.

According to an embodiment of the present disclosure, it is possible to provide a real-time location-related service through a user terminal capable of providing mobile applications and location-related services while overcoming space-time constraints.

In addition, according to an embodiment of the present disclosure, it is possible to realize a new type of business model that can create various profits in restrictions in an untact industrial environment between real-time location-related service consumers, location-related service providers, platform operators, and/or advertising operators that provide additional services along with location-related services through a communication network.

The effects to be achieved by the present disclosure are not limited to the above-mentioned effects, and other effects not mentioned may be clearly understood by those skilled in the art from the following description.

BRIEF DESCRIPTION OF THE DRAWINGS

The accompanying drawings, which are included as part of the detailed description to help the understanding of the present disclosure, provide embodiments of the present disclosure, and explain the technical features of the present disclosure together with the detailed description.

FIGS. 8 to 9 are examples in which Walking Man information according to an embodiment of the present disclosure is disclosed.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A location information service providing method disclosed in the present disclosure may be provided through an application for providing a location information service. This application may register and manage a terminal (hereinafter referred to as a Walking Man device) of a service provider (hereinafter referred to as a Walking Man) capable of providing an appropriate location information service in response to a request of a service requestor.

Figure 1:
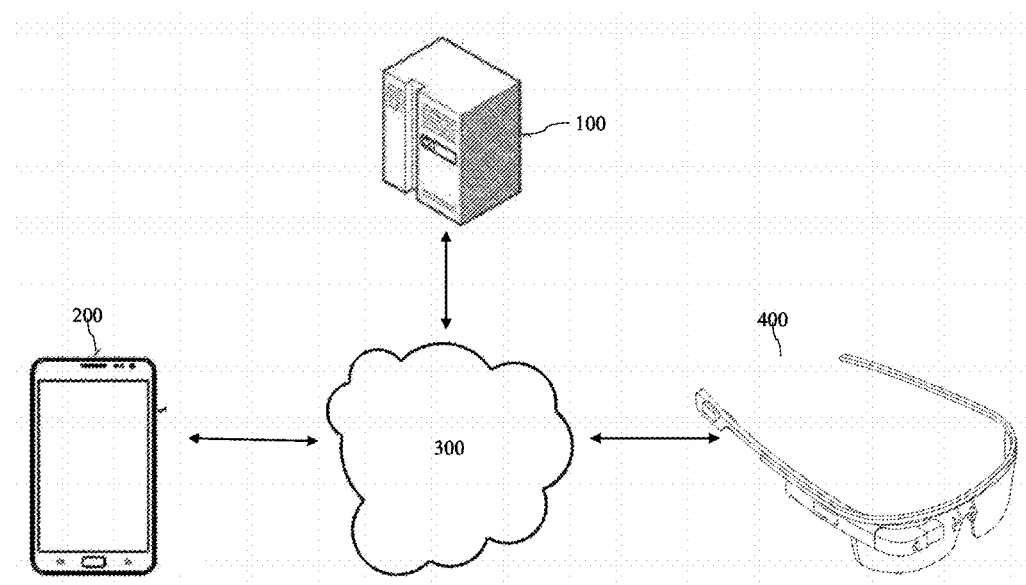
FIG. 1 is a diagram for describing a system for providing a location information service according to an embodiment of the present disclosure.
Figure 2:
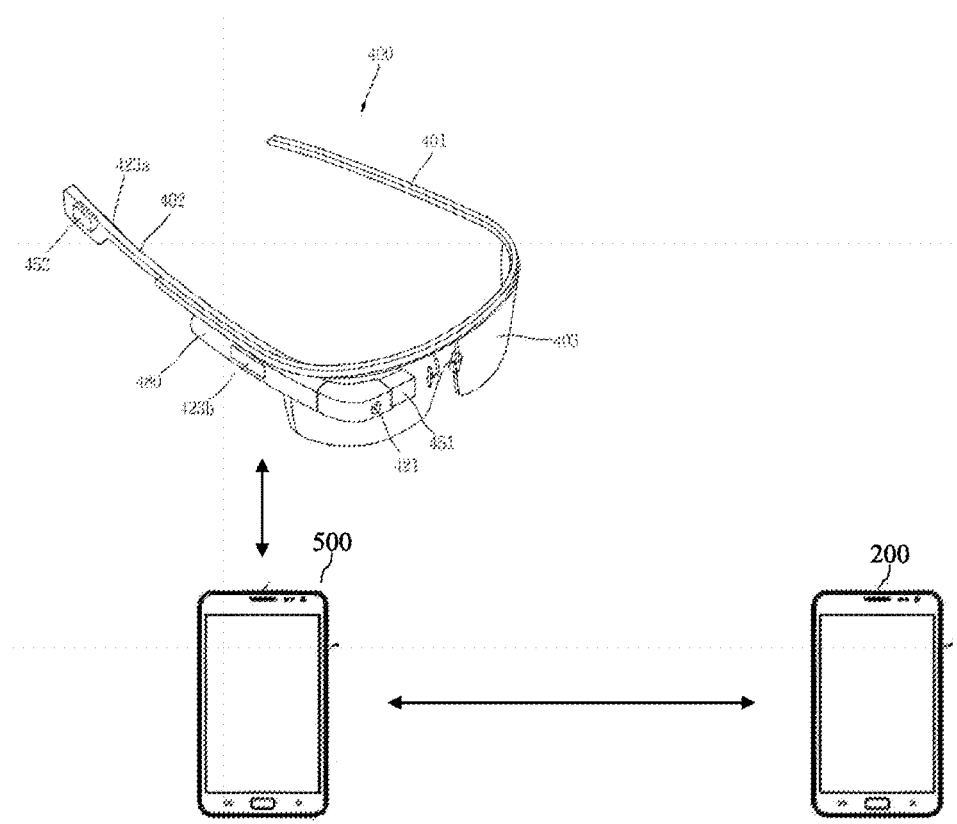
FIG. 2 shows an example of using a terminal by a location-related service provider.

FIG. 1 is a diagram for describing a system for providing a location information service according to an embodiment of the present disclosure. FIG. 2 shows an example of using a terminal of a location-related service provider.

Referring to FIG. 1, a system for providing location information service according to an embodiment of the present specification may include a server 100, a location-related service requester terminal 200, and a Walking Man device 400. It is assumed that the server 100, the service requester terminal 200, and the Walking Man device 400 can implement the location information service technology by applying a wireless data communication technology provided by a network 300.

The server 100 manages the application for providing the location information service and may manage each user of the service requester terminal 200 and the Walking Man device 400 as members.

The Walking Man device 400 may include any terminal having a camera. The Walking Man device 400 may provide a location-related service based on camera images in response to an access and mission request of the service requester terminal 200 through the server 100 and the network 300. Although FIG. 1 shows a glasses device that can be put on the user's head as the Walking Man device, the Walking Man device 400 is not limited to glasses and may include any device having a camera function, such as a watch and a personal portable terminal.

Referring to FIG. 2, the Walking Man device 400 may be operated while being connected to a personal portable terminal owned by a Walking Man through Bluetooth. That is, the application for providing the location information service is installed in a personal portable terminal 500 of a Walking Man, and when a service request is received from the service requester terminal 200 and accepted, an image captured by a camera of the glasses 400 connected through Bluetooth may be transmitted to the service requester terminal 200 through the application.

The present disclosure will be described on the assumption that the glass-type mobile terminal 400 shown in FIG. 2 is a Walking Man device.

The glass-type mobile terminal 400 is configured to be put on the head of a user and may include a frame (a case, a housing, or the like) for this purpose. The frame may be formed of a flexible material such that a user can easily wear. In this figure, the frame includes a first frame 401 and a second frame 402 made of different materials.

The frame is supported on the user's head and provides a space in which various parts are mounted. As shown, electronic components such as a control module 480 and an audio output module 452 may be mounted on the frame. In addition, a lens 403 covering at least one of the left eye and the right eye may be detachably mounted on the frame.

The control module 480 controls various electronic components included in the mobile terminal 400. The control module 480 may be understood as a component corresponding to a controller 180. In this figure, the control module 480 is provided on the frame on one side of the user's head, but the position of the control module 480 is not limited thereto.

A display 451 may be implemented in the form of a head mounted display (HMD). The HMD refers to a display that is mounted on the user's head and directly displays an image in front of the user's eyes. The display 451 may be disposed to correspond to at least one of the left and right eyes such that it directly displays an image in front of the user's eyes when the user wears the glass-type mobile terminal 400. In this drawing, the display 451 is located to correspond to the right eye of the user such that an image can be displayed to the user's right eye.

The display 451 may project an image to the user's eyes using a prism. In addition, the prism may be light-transmissive such that the user can view the projected image and a normal field of view (a range of the user's eyes) together.

As such, an image output through the display 451 may be displayed overlapping with a normal field of view. The mobile terminal 400 may provide Augmented Reality (AR), in which a virtual image is superimposed on a real image or a background and displayed as a single image, using the characteristics of the display.

A camera 421 is disposed adjacent to at least one of the left eye and the right eye and is configured to capture a front view image. Since the camera 421 is positioned adjacent to the eyes, the camera 421 can acquire a scene viewed by the user as an image.

In this figure, the camera 421 is provided in the control module 480 but is not necessarily limited thereto. The camera 421 may be provided in the frame, or a plurality of cameras may be provided to obtain a stereoscopic image.

The glass-type mobile terminal 400 may include user input units 423a and 423b operated to receive a control command. The user input units 423a and 423b may employ any tactile manner, such as a touch or a push, in which a user manipulates it while experiencing a tactile feeling. In this figure, the frame and the control module 480 are provided with push and touch input type user input units 423a and 423b.

In addition, the glass-type mobile terminal 400 may include a microphone (not shown) that receives sound and processes the sound into electrical sound data, and a sound output module 452 that outputs sound. The sound output module 452 may be configured to transmit sound using a general sound output method or a bone conduction method. In a case where the sound output module 452 is implemented in a bone conduction manner, when the user wears the mobile terminal 400, the sound output module 452 comes into contact with the head and transmits sound by vibrating the skull.

Figure 3:
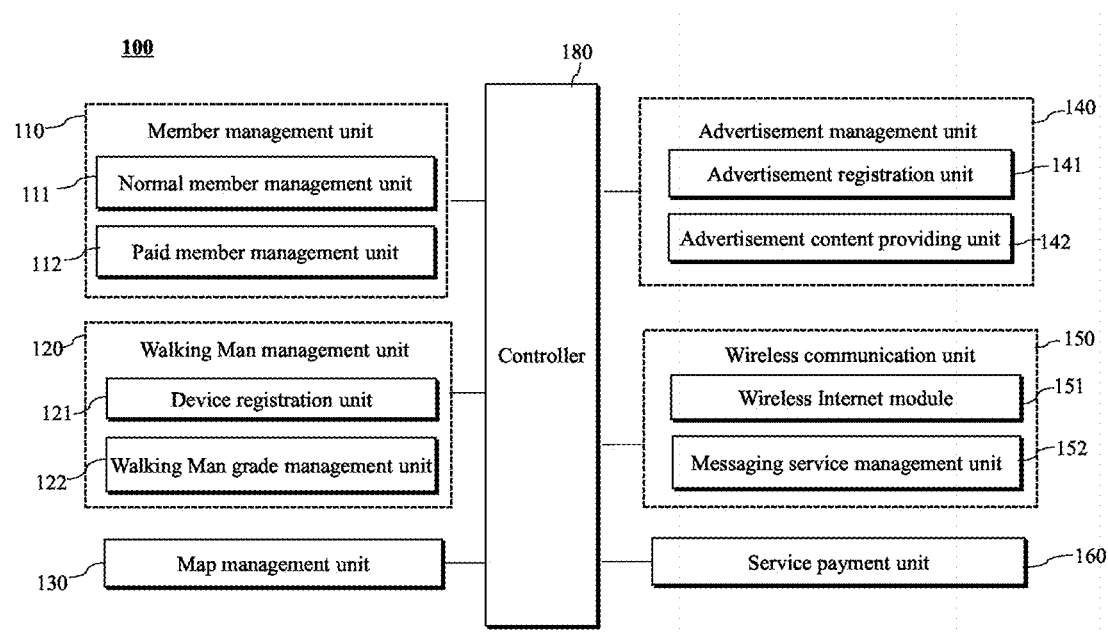
FIG. 3 is a block diagram of a server that implements provision of a location information service according to an embodiment of the present disclosure.

FIG. 3 is a block diagram of a server for providing the location information service according to an embodiment of the present disclosure.

Referring to FIG. 3, the server 100 for providing the location information service according to an embodiment of the present disclosure may include a member management unit 110, a Walking Man management unit 120, a map management unit 130, an advertisement management unit 140, a wireless communication unit 150, and a service payment unit 160.

The member management unit 110 manages users who are subscribed to the application to receive the location-related service or provide the location-related service. A general member management unit 111 manages free members and manages them such that they can freely receive location-based images provided by the Walking Man as long as they are subscribed to the application. A paid member management unit 112 manages paid members, and the paid members not only receive the location-based service provided by a Walking Man but also request that the Walking Man located remotely perform a predetermined mission. The paid member management unit 112 may classify the paid members into a plurality of grades according to service types that can be provided by Walking Men and manage them. For example, paid members may request different missions, such as a mission in which a Walking Man can respond to a request of a service requester relatively simply by controlling a camera direction at the current location, a mission in which a Walking Man needs leave the current location, a mission in which a Walking Man needs to leave the current location and perform an additional action (e.g., a personal errand of a service requester), and a request for a personal errand by a service requestor, according to grades thereof.

The Walking Man management unit 120 may manage Walking Men through a database. The database for managing Walking Men may include a device registration unit 121 and a Walking Man grade management unit 122. The device registration unit 121 may register and manage devices used by Walking Men to provide the location-based service. The Walking Man grade management unit 122 may manage personal information (ages, occupations, places of residence, etc.) of Walking Men, the number of subscribers subscribing to the Walking Men, total activity times of the Walking Men, responsiveness of consumers (service requesters) to activities of the Walking Men (e.g., the number of "likes" acquired), points owned by the Walking Men, advertisement content linked to the Walking Men, and the like together.

The map management unit 130 may manage maps of the world in order to provide the location-based service to service requesters through a Walking Man device. The map management unit 130 may map a Walking Man graphic object on a map on the basis of location information of the Walking Man device and provide the map through the application.

The advertisement management unit 140 may manage advertisements such that the advertisements are provided along with the location-related service through Walking Men. An advertisement registration unit 141 may manage advertisements registered by advertisement providers in areas where Walking Men are working. An advertisement content providing unit 142 manages registered advertisements such that they are provided together with the location-related service of Walking Men. In particular, the advertisement content providing unit 142 may provide different pieces of advertisement content depending on whether a service requester is a paid member or a recognition level of a Walking Man.

The wireless communication unit 150 may provide wireless communication based application services, such as installation and updating of the application, reception of a request from a service requestor, and transmission of an image provided by a Walking Man through data communication with the service requester terminal 200 and the Walking Man device 400. The wireless communication unit 150 may include a wireless Internet module 151 and a messaging service management unit 152.

The wireless Internet module 151 refers to a module for wireless Internet access and may be provided inside or outside the server 100. The wireless Internet module 151 is configured to transmit and receive radio signals in a communication network according to wireless Internet technologies. Wireless Internet technologies include, for example, a wireless LAN (WLAN), Wireless-Fidelity (Wi-Fi), Wi-Fi Direct, Digital Living Network Alliance (DLNA), wireless broadband (WiBro), world interoperability for microwave access (WiMAX), high speed downlink packet access (HSDPA), high speed uplink packet access (HSUPA), Long Term Evolution (LTE), Long Term Evolution-Advanced (LTE-A), 5G, and the like, and the wireless Internet module 113 transmits and receives data according to at least one wireless Internet technology within a range including Internet technologies which are not listed above.

The messaging service management unit 152 allows only paid members of the application to request a predetermined mission to a Walking Man, and can manage mission execution requests and acceptance through the Walking Man device and a messaging application. The messaging application may include a messenger application, an application including a voice input/output interface, and the like.

The service payment unit 160 may manage temporary and non-temporary paid service operations, such as payment for paid members and cases in which a general member temporarily requests that a Walking Man perform a predetermined mission. The service payment unit 160 may perform payment management in association with Mobile Pay and payment institutions (financial institutions, etc.).

Figure 4:
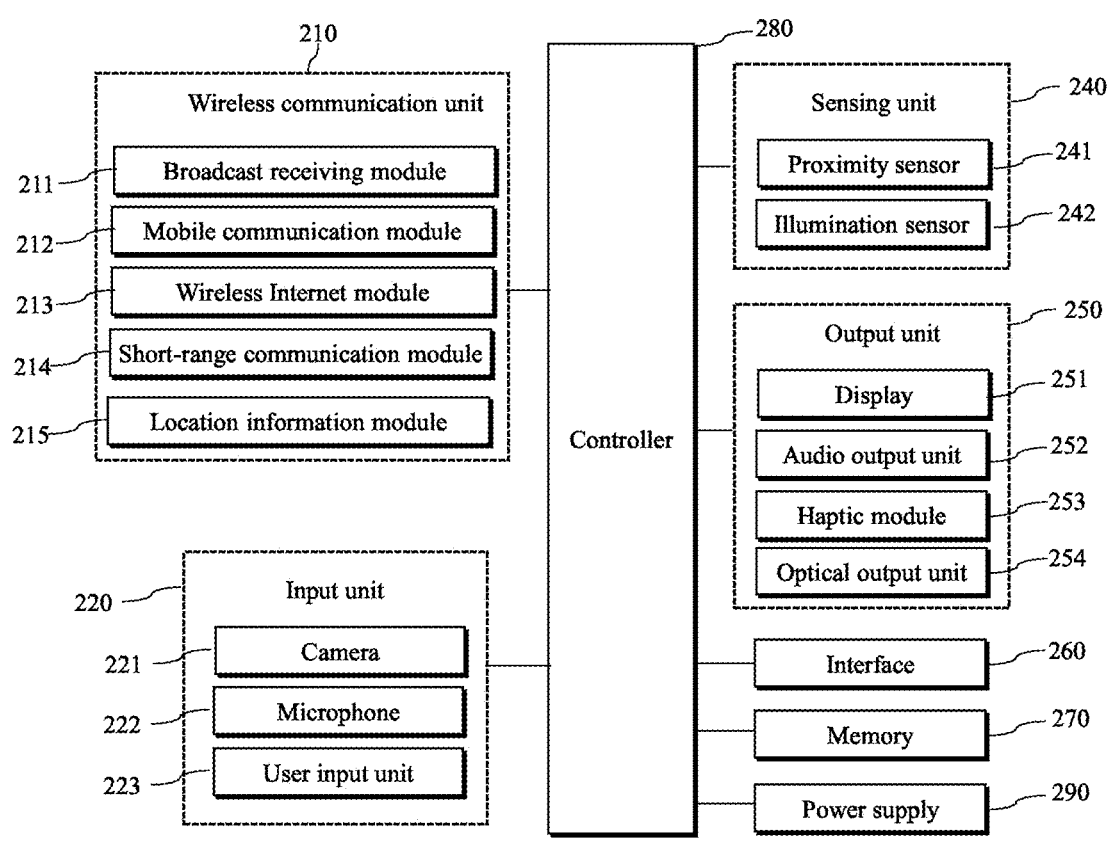
FIG. 4 is an exemplary block diagram of a terminal of a location information service requester and/or provider according to an embodiment of the present disclosure.

FIG. 4 is an exemplary block diagram of a terminal of a location information service requester and/or provider according to an embodiment of the present disclosure. The service requester terminal will be referred to as a mobile terminal 200 for convenience.

The mobile terminal 200 may include a wireless communication unit 210, an input unit 220, a sensing unit 240, an output unit 250, an interface 260, a memory 270, a controller 280, a power supply 290, and the like. The components shown in FIG. 4 are not essential for implementing the mobile terminal, and thus the mobile terminal described herein may have more or fewer components than those listed above.

More specifically, among the components, the wireless communication unit 210 may include one or more modules that enable wireless communication between the mobile terminal 200 and a wireless communication system, between the mobile terminal 200 and another mobile terminal 200, or between the mobile terminal 200 and an external server. Further, the wireless communication unit 210 may include one or more modules that connect the mobile terminal 200 to one or more networks.

The wireless communication unit 210 may include at least one of a broadcast receiving module 211, a mobile communication module 212, a wireless Internet module 213, a short-range communication module 214, and a location information module 215.

The input unit 220 may include a camera 221 or an image input unit for receiving image signal input, a microphone 222 or an audio input unit for receiving audio signal input, and a user input unit 223 (e.g., a touch key, a mechanical key, and the like) for receiving information from a user. Voice data or image data collected by the input unit 220 may be analyzed and processed as a control command of a user.

The sensing unit 240 may include one or more sensors for sensing at least one of information in the mobile terminal, information on the environment surrounding the mobile terminal, and user information. For example, the sensing unit 240 may include at least one of a proximity sensor 241, an illumination sensor 242, a touch sensor, an acceleration sensor, a magnetic sensor, a G-sensor, a gyroscope sensor, a motion sensor, an RGB sensor, an IR sensor, a finger scan sensor, an ultrasonic sensor, an optical sensor (e.g., camera (refer to 221)), a microphone (refer to the microphone 222), a battery gauge, environmental sensors (e.g., a barometer, a hygrometer, a thermometer, a radiation detection sensor, a heat detection sensor, a gas detection sensor, etc.), chemical sensors (e.g., an electronic nose, a healthcare sensor, a biometric sensor, etc.). Meanwhile, the mobile terminal disclosed in the present disclosure may combine and utilize information sensed by at least two sensors described above.

The output unit 250 generates an output related to sight, hearing or touch and may include at least one of a display 251, an audio output unit 252, a haptic module 253, and an optical output unit 254. The display 251 may implement a touchscreen by forming a layer structure with a touch sensor or being integrated with the touch sensor. Such a touchscreen may function as the user input unit 223 providing an input interface between the mobile terminal 200 and the user and also provide an output interface between the mobile terminal 200 and the user.

The interface 260 serves as a passage for various types of external devices connected to the mobile terminal 200. The interface 260 may include at least one of a wired/wireless headset port, an external charger port, a wired/wireless data port, a memory card port, a port for connecting a device including an identification module, an audio input/output (I/O) port, a video input/output (I/O) port, and an earphone port. In response to connection of an external device to the interface 260, the mobile terminal 200 may perform appropriate control related to the connected external device.

In addition, the memory 270 stores data supporting various functions of the mobile terminal 200. The memory 270 may store a plurality of application programs (or applications) executed in the mobile terminal 200, data for operation of the mobile terminal 200, and commands. At least some of these application programs may be downloaded from an external server through wireless communication. In addition, at least some of these application programs may be present in the mobile terminal 200 from the time of shipment for basic functions (e.g., call incoming and outgoing functions, and message receiving and sending functions) of the mobile terminal 200. Meanwhile, the application programs may be stored in the memory 270, installed on the mobile terminal 200, and driven by the controller 280 to perform operations (or functions) of the mobile terminal.

The controller 280 controls the overall operation of the mobile terminal 200 in addition to operations related to the application programs. The controller 280 may provide appropriate information or functions to the user or process them by processing signals, data, information, and the like input or output through the components described above or by executing application programs stored in the memory 270.

In addition, the controller 280 may control at least some of the components described with reference to FIG. 1 in order to execute application programs stored in the memory 270. Furthermore, the controller 280 may combine and operate at least two components included in the mobile terminal 200 to execute the application programs.

The power supply 290 receives external power and internal power under the control of the controller 280 and supplies power to each component included in the mobile terminal 200. The power supply 290 includes a battery, and the battery may be a built-in battery or a replaceable battery.

At least some of the above-described components may operate in cooperation to implement an operation, control, or a control method of a mobile terminal according to various embodiments which will be described below. Further, the operation, control, or control method of the mobile terminal may be implemented on the mobile terminal by executing at least one application program stored in the memory 270.

Hereinafter, the above-listed components will be described in more detail with reference to FIG. 1 prior to description of various embodiments implemented through the mobile terminal 200 described above.

First, the wireless communication unit 210 will be described. The broadcast receiving module 211 of the wireless communication unit 210 receives a broadcast signal and/or broadcast-related information from an external broadcast management server through a broadcast channel. The broadcast channel may include a satellite channel and a terrestrial channel. Two or more broadcast receiving modules may be provided in the mobile terminal 200 in order to simultaneously receive broadcast of at least two broadcast channels or switch broadcast channels.

The mobile communication module 212 transmits/receives radio signals to/from at least one of a base station, an external terminal, and a server over a mobile communication network constructed according to technical standards or communication methods for mobile communication (e.g., global system for mobile communication (GSM), code division multiple access (CDMA), code division multiple access 2000 (CDMA 2000), enhanced voice-data optimized or enhanced voice-data only (EV-DO), wideband CDMA) (WCDMA), high speed downlink packet access (HSDPA), high speed uplink packet access (HSUPA), Long Term Evolution (LTE), Long Term Evolution-Advanced (LTE-A), etc.

The radio signals may include a voice call signal, a video call signal, and various types of data according to text/multimedia message transmission/reception.

The wireless Internet module 213 refers to a module for wireless Internet access, and may be provided inside or outside the mobile terminal 200. The wireless Internet module 213 is configured to transmit and receive radio signals in a communication network according to wireless Internet technologies.

Wireless Internet technologies include, for example, WLAN, Wi-Fi, Wi-Fi Direct, DLNA, WiBro, WiMAX, HSDPA, HSUPA, LTE, LTE-A, etc., and the wireless Internet module 213 transmits and receives data according to at least one wireless Internet technology within a range including Internet technologies not listed above.

From the viewpoint that wireless Internet access by WiBro, HSDPA, HSUPA, GSM, CDMA, WCDMA, LTE, LTE-A, etc. is performed through a mobile communication network, the wireless Internet module 213 performing wireless Internet access through the mobile communication network may be understood as a kind of the mobile communication module 212.

The short-range communication module 214 is for short-range communication, and can support short-range communication using at least one of Bluetooth™, radio frequency identification (RFID), infrared data association (IrDA), Ultra Wideband (UWB), ZigBee, near field communication (NFC), Wi-Fi, Wi-Fi Direct, and wireless Universal Serial Bus (USB). The short-range communication module 214 can support wireless communication between the mobile terminal 200 and a wireless communication system, between the mobile terminal 200 and another mobile terminal 200, or between the mobile terminal 200 and a network in which another mobile terminal 200 (or an external server) is located through wireless area networks. The wireless area networks may be wireless personal area networks.

Here, another mobile terminal 200 may be a wearable device (for example, a smart watch, smart glasses, or a head mounted display (HMD)) capable of exchanging (or associating) data with the mobile terminal 200 according to the present disclosure. The short-distance communication module 214 may detect (or recognize) a wearable device capable of communicating with the mobile terminal 200 around the mobile terminal 200. Furthermore, if the detected wearable device is a device authorized to communicate with the mobile terminal 200 according to the present disclosure, the controller 280 may transmit at least some of data processed by the mobile terminal 200 to the wearable device through the short-range communication module 214. Accordingly, the user of the wearable device may use data processed by the mobile terminal 200 through the wearable device. For example, when a call is received by the mobile terminal 200, the user can make a phone call through the wearable device, or when a message is received by the mobile terminal 200, the user can check the received message through the wearable device.

The location information module 215 is a module for acquiring the location (or current location) of the mobile terminal, and representative examples thereof include a global positioning system (GPS) module and a wireless fidelity (Wi-Fi) module. For example, when the GPS module is used, the mobile terminal can acquire the location of the mobile terminal using signals transmitted from GPS satellites. As another example, when the Wi-Fi module is used, the mobile terminal can acquire the location of the mobile terminal on the basis of information of a wireless access point (AP) that transmits/receives radio signals to/from the Wi-Fi module. Alternatively or additionally, the location information module 215 may execute any function of other modules of the wireless communication unit 210 in order to obtain data regarding the location of the mobile terminal if required. The location information module 215 is a module used to obtain the location (or current location) of the mobile terminal, and is not limited to a module that directly calculates or acquires the location of the mobile terminal.

Next, the input unit 220 receives video information (or signals), audio information (or signals), data, or information input from a user, and the mobile terminal 200 may include on e or more cameras 221 for receiving video information. The camera 221 processes an image frame such as a still image or a moving image obtained by an image sensor in a video call mode or a photographing mode. The processed image frame may be displayed on the display 251 or stored in the memory 270. Meanwhile, the plurality of cameras 221 provided in the mobile terminal 200 may be arranged to form a matrix structure, and a plurality of pieces of video information having various angles or focal points may be input to the mobile terminal 200 through the cameras 221 forming the matrix structure. The plurality of cameras 221 may be arranged in a stereo structure to obtain left and right images for realizing a stereoscopic image.

The microphone 222 processes external sound signals into electrical voice data. The processed voice data may be utilized in various ways according to the function being executed (or application program being executed) in the mobile terminal 200. Meanwhile, various noise cancellation algorithms for removing noise generated in the process of receiving an external audio signal may be implemented in the microphone 222.

The user input unit 223 is for receiving information from a user. When information is input through the user input unit 223, the controller 280 can control the operation of the mobile terminal 200 to respond to the input information. This user input unit 223 may include a mechanical input means (or a mechanical key, for example, a button disposed on the front, rear or side of the mobile terminal 200, a dome switch, a jog wheel, jog switch, or the like) and a touch input means. As an example, the touch input means may include a virtual key, a soft key, or a visual key displayed on a touchscreen through software processing, or a touch key disposed in a part other than the touchscreen. The virtual key or visual key can be displayed on the touchscreen while having various forms, for example, graphic, text, an icon, video, or combinations thereof.

The sensing unit 240 senses at least one of information in the mobile terminal, information on the environment surrounding the mobile terminal, and user information, and generates a sensing signal corresponding thereto. Based on such a sensing signal, the controller 280 may control driving or operation of the mobile terminal 200 or perform data processing, functions, or operations related to application programs installed in the mobile terminal 200. Representative sensors among various sensors that may be included in the sensing unit 240 will be described in more detail.

First, the proximity sensor 241 refers to a sensor that detects the presence or absence of an object approaching a predetermined detection surface or an object present nearby without mechanical contact by using the force of an electromagnetic field or infrared rays. The proximity sensor 241 may be disposed in the internal area of the mobile terminal surrounded by the touchscreen described above or in the vicinity of the touchscreen.

Examples of the proximity sensor 241 include a transmission type photoelectric sensor, a direct reflection type photoelectric sensor, a mirror reflection type photoelectric sensor, a high frequency oscillation type proximity sensor, a capacitance type proximity sensor, a magnetic type proximity sensor, an infrared proximity sensor, and the like. If the touchscreen is of a capacitive type, the proximity sensor 241 may be configured to detect the proximity of a conductive object using a change in electric fields due to the proximity of the object. In this case, the touchscreen (or touch sensor) itself may be classified as a proximity sensor.

For convenience of description, an action of approaching the touchscreen without contacting an object to recognize that the object is located above the touchscreen is referred to as "proximity touch," and an action of actually touching the touchscreen with an object is referred to as "contact touch." A position at which an object is proximity-touched on the touchscreen means a position at which the object vertically corresponds to the touchscreen when the object is proximity-touched. The proximity sensor 241 may detect a proximity touch and a proximity touch pattern (e.g., a proximity touch distance, a proximity touch direction, a proximity touch speed, a proximity touch time, a proximity touch position, a proximity touch movement state, etc.). As described above, the controller 280 may process data (or information) corresponding to a proximity touch operation and a proximity touch pattern detected through the proximity sensor 241 and provide visual information corresponding to the processed data on the touchscreen. Furthermore, the controller 280 may control the mobile terminal 200 to process different operations or data (or information) depending on whether a touch to the same point on the touchscreen is a proximity touch or a contact touch.

The touch sensor detects a touch (or touch input) applied to the touchscreen (or the display 251) using at least one of various touch methods such as a resistive film method, a capacitive method, an infrared method, an ultrasonic method, and a magnetic field method.

As an example, the touch sensor may be configured to convert a change in pressure applied to a specific part of the touchscreen or capacitance generated in the specific part into an electrical input signal. The touch sensor may be configured to detect the position, area, pressure, capacitance, and the like of a touch of a touch object applied to the touchscreen. Here, the touch object is an object that applies a touch to the touch sensor, and may be, for example, a finger, a touch pen, a stylus pen, or a pointer.

As such, when there is a touch input to the touch sensor, corresponding signals are sent to a touch controller. The touch controller processes the signals and then transmits corresponding data to the controller 280. Thus, the controller 280 can ascertain which area of the display 251 has been touched. Here, the touch controller may be a separate component from the controller 280 or may be the controller 280 itself.

Meanwhile, the controller 280 may perform different controls or the same control according to the type of the touch object that touches the touchscreen (or a touch key other than the touchscreen). Whether different controls or the same control is to be performed according to the type of the touch object may be determined according to an operating state of the mobile terminal 200 or an application program being executed.

The touch sensor and proximity sensor described above may sense a touch in various manners such as short (or tap) touch, long touch, multi-touch, drag touch, flick touch, pinch-in touch, pinch-out touch, swipe touch, and hovering touch on the touchscreen independently or in a combined manner.

An ultrasonic sensor may recognize location information of a sensing target by using ultrasonic waves. The controller 280 can calculate the location of a wave generation source through information detected by the optical sensor and a plurality of ultrasonic sensors. The location of the wave generation source can be calculated using the property that light is much faster than ultrasonic waves, that is, the time required for light to reach the optical sensor is much shorter than the time required for ultrasonic waves to reach the ultrasonic sensor. More specifically, the location of the wave generation source can be calculated using a time difference between the arrival time of the ultrasonic waves and the arrival time of light using light as a reference signal.

A posture detection sensor may detect motion information such as presence or absence of motion, distance, speed, acceleration, and direction of the mobile terminal and/or posture information such as an angle at which the mobile terminal 200 is tilted with respect to a predetermined rotational axis.

The posture detection sensor 143 may include at least one acceleration sensor 144, at least one gyroscope (gyro sensor 143), or a sensing signal processor (not shown) that compensates for a sensing value or converts sensing information.

The posture detection sensor may obtain a linear motion, a rotational motion, shaking information, and the like of the mobile terminal 200 based on an acceleration detected through various sensors. The acceleration sensor 144 detects a motion of the mobile terminal 200, obtains the acceleration, and detects information on presence or absence of a motion, distance, speed, acceleration, direction, and the like of the mobile terminal 200.

In addition, the gyro sensor 143 may detect rotation of the mobile terminal 200 and obtain a rotation amount. The acceleration sensor 143 may represent the detected acceleration as vector values with respect to three axes (X-axis, Y-axis, and Z-axis), and the gyroscope may represent the detected acceleration as rotation vector values (roll, pitch, and yaw) with respect to the three axes. The posture detection sensor can detect the speed, position, and position change of the mobile terminal 200 by including the acceleration sensor 144 and the gyro sensor 143. The posture detection sensor may be a general inertial navigation system (INS), and the gyro sensor may be an optical, mechanical, or piezoelectric gyroscope.

The sensing signal processor (not shown) may convert analog signals output from the acceleration sensor and the gyroscope into analog/digital signals, integrates the converted signals, tracks trajectories, and convert the signals into motion information, angle information, shaking information, and the like.

Although the posture detection sensor including the acceleration sensor 144 and the gyro sensor 143 to acquire the posture and motion of the mobile terminal 200 according to an embodiment of the present disclosure has been described above, the present disclosure is not necessarily limited thereto. Motion and posture information of the mobile terminal 200 may be obtained using an arbitrary sensor within a range capable of achieving the object of the present invention.

As a component of the input unit 220, the camera 221 includes at least one of a camera sensor (e.g., CCD, CMOS, or the like), a photo sensor (or image sensor), and a laser sensor.

The camera 221 and the laser sensor may be combined to detect a touch of a sensing target for a 3D stereoscopic image. The photo sensor may be stacked on a display device, and this photo sensor is configured to scan a motion of a sensing target close to the touchscreen. More specifically, the photo sensor includes photo diodes and transistors provided in rows/columns and scans an object placed on the photo sensor using electrical signals that change according to the amount of light applied to the photo diodes. That is, the photo sensor calculates the coordinates of the sensing target according to change in the amount of light, and thus location information of the sensing target can be obtained.

The display 251 displays (outputs) information processed by the mobile terminal 200. For example, the display 251 may display information on an execution screen of an application program executed in the mobile terminal 200 or user interface (UI) and graphic user interface (GUI) information according to the execution screen information.

Further, the display 251 may be configured as a 3D display that displays 3D images.

A 3D display method such as a stereoscopic method (glasses method), an auto-stereoscopic method (non-glasses method), or a projection method (holographic method) may be applied to the 3D display.

The audio output unit 252 may output audio data received from the wireless communication unit 210 or stored in the memory 270 in a call signal reception, a call mode or a recording mode, a voice recognition mode, a broadcast reception mode, and the like. The audio output unit 252 also outputs audio signals related to functions performed by the mobile terminal 20 (e.g., call signal reception sound, message reception sound, and the like). The audio output unit 252 may include a receiver, a speaker, a buzzer, and the like.

The haptic module 253 generates various tactile effects that a user can feel. A representative example of tactile effects generated by the haptic module 253 may be vibration. The strength and pattern of a vibration generated by the haptic module 253 may be controlled by selection of a user or by settings of the controller. For example, the haptic module 253 may combine and output different vibrations or sequentially output the same.

In addition to vibration, the haptic module 253 may generate various tactile effects such as a pin array that move vertically with respect to a contact skin surface, an air blowing or suction force through a nozzle or a suction port, rubbing against the skin surface, electrode contact, effects of stimuli such as electrostatic force, and effects of reproducing cold and hot sensations using elements capable of absorbing or generating heat.

The haptic module 253 can deliver tactile effects through direct contact and can also be implemented such that a user can feel tactile effects through muscle sensations of the fingers or arms. Two or more haptic modules 253 may be provided according to the configuration of the mobile terminal 200.

The optical output unit 254 outputs a signal for notifying of occurrence of an event using light from a light source of the mobile terminal 200. Examples of events occurring in the mobile terminal 200 may include message reception, call signal reception, missed calls, alarms, schedule notifications, e-mail reception, and information reception through applications.

The optical output unit 254 outputs a signal when the mobile terminal emits light of a single color or multiple colors forward or backward. Output of the signal may be terminated when the mobile terminal detects that the user has checked an event.

The interface 260 serves as a passage for all external devices connected to the mobile terminal 200. The interface 260 receives data from an external device, receives power and transmits the power to each component in the mobile terminal 200, or transmits data inside the mobile terminal 200 to an external device. For example, the interface 260 may include a wired/wireless headset port, an external charger port, a wired/wireless data port, a memory card port, a port for connecting a device having an identification module, an audio input/output (I/O) port, a video input/output (I/O) port, an earphone port, and the like.

The identification module is a chip that stores various types of information for authenticating the right to use the mobile terminal 200 and may include a user identify module (UIM), a subscriber identity module (SIM), and a universal subscriber identity module (USIM). A device having the identification module (hereinafter referred to as an "identification device") may be manufactured in the form of a smart card. Accordingly, the identification device may be connected to the mobile terminal 200 through the interface 260.

In addition, the interface 260 may serve as a passage through which power from an external cradle is supplied to the mobile terminal 200 when the mobile terminal 200 is connected to the external cradle or serve as a passage through which various command signals input to the cradle by a user are transmitted to the mobile terminal 200. The various command signals or the power input from the cradle may operate as signals for recognizing that the mobile terminal 200 has been correctly mounted on the cradle.

The memory 270 may store programs for operation of the controller 280 and may temporarily store input/output data (e.g., a phonebook, messages, still images, videos, etc.). The memory 270 may store data related to vibration and sound of various patterns output when a touch is applied to the touchscreen.

The memory 270 may include at least one of a flash memory type, a hard disk type, a solid state disk (SSD) type, a silicon disk drive (SDD) type, a multimedia card micro type, a card-type memory (e.g., SD, XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The mobile terminal 200 may be operated in association with a web storage that performs a storage function of the memory 270 on the Internet.

As described above, the controller 280 controls operations related to application programs and general operations of the mobile terminal 200 in general. For example, if the state of the mobile terminal satisfies set conditions, the controller 280 may execute or release a locked state that restricts input of control commands of the user to applications.

In addition, the controller 280 may perform control and processing related to voice calls, data communications, video calls, and the like or perform pattern recognition processing of recognizing handwriting input or drawing input performed on the touchscreen as characters and images. Furthermore, the controller 280 may control any one or a plurality of components described above in combination in order to implement various embodiments described below in the mobile terminal 200 according to the present invention.

The power supply 290 receives external power and internal power under the control of the controller 280 and supplies power necessary for the operation of each component. The power supply 290 includes a battery, and the battery may be a built-in battery capable of being charged and may be detachably coupled to the terminal body for charging.

In addition, the power supply 290 may have a connection port, and the connection port may be configured as an example of the interface 260 to which an external charger that supplies power for battery charging is electrically connected.

As another example, the power supply 290 may charge the battery in a wireless manner without using the connection port. In this case, the power supply 290 may receive power from an external wireless power transmitter using at least one of an inductive coupling method based on magnetic induction or a magnetic resonance coupling method based on electromagnetic resonance.

The functional blocks constituting the service requester terminal 200 have been described above. However, when the Walking Man device 100 is not a glasses device but a mobile terminal such as a mobile phone, that the functions described with reference to FIG. 4 can be equally applied to the Walking Man device 100.

Hereinafter, various embodiments may be implemented in a recording medium readable by a computer or a similar device using, for example, software, hardware, or a combination thereof.

Figure 5:
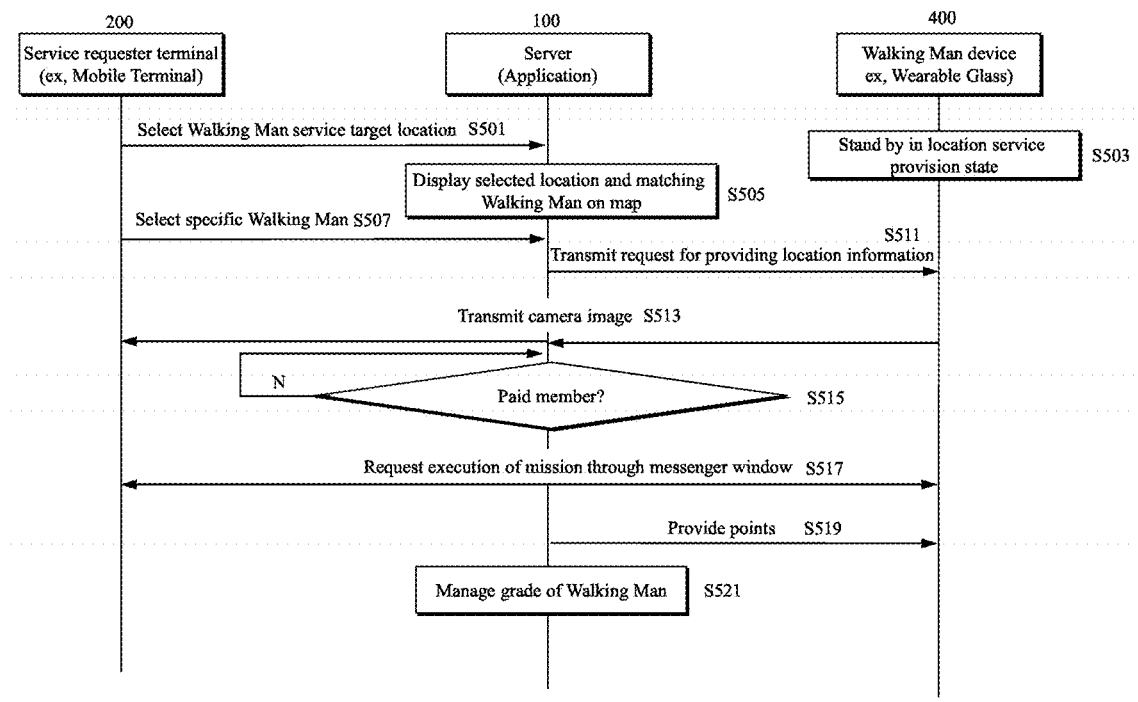
FIG. 5 is a flowchart of an operation of a location information service providing system according to an embodiment of the present disclosure.

FIG. 5 is a flowchart of an operation of the location information service providing system according to an embodiment of the present disclosure.

Referring to FIG. 5, a service requestor device 200 (hereinafter referred to as a user terminal) may receive a location-related service based on camera images of a Walking Man device 400 through the application for providing the location-related service, provided by the server 100.

The user device 200 may select a Walking Man service target location from a map provided by the application (S501).

The server 100 displays a map corresponding to the location selected through the user device 200 and may control the application such that at least one Walking Man device 400 present in a service provision standby state at the selected location is displayed on the map (S505).

Here, the Walking Man device 400 displayed on the map means a device in the service provision standby state and does not mean all devices registered in the application and present in the vicinity of the selected location. To this end, the Walking Man device 400 registers in the application in advance to indicate that it can provide a location-based video service at the place where the Walking Man is currently located, and thus the Walking Man device 400 can stand by in a location service provision state (S503). According to an embodiment, when the Walking Man device 400 registered in the application starts a camera function, the Walking Man device 400 can be automatically registered in the application in the location service provision standby state. A method of switching the Walking Man device 400 to the location service provision standby state is not limited to the above example and may be modified and implemented in various manners.

The Walking Man device 400 may be displayed on the map in various graphic object forms. For example, a graphic object indicating the Walking Man device 400 may be displayed as a camera icon, a picture of an actual Walking Man, an icon indicating real-time video streaming, or the like.

In addition, visual characteristics of the graphic object may be differently displayed according to the recognition level of the Walking Man. The visual characteristics of the graphic object indicating the Walking Man may be differently displayed according to at least one of the number of service requesters, the number of times of providing location information, the number of mission requests by paid members, the number of missions performed, a degree of responsiveness of a service requester according to mission performance, types of missions that can be performed, and difficulty levels of missions that can be performed. As a result, a service requester can more intuitively select a desired Walking Man through a graphic object displayed on the map.

The service requester terminal 200 may select a specific Walking Man through an input to a Walking Man graphic object displayed on the map (S507).

The application may regard selection of the specific Walking Man as a location information provision request signal and transmit a location information provision request signal to the specific Walking Man device selected by the service requester terminal 200 (S511).

When the selected specific Walking Man device accepts the location information provision request, it may transmit an image obtained through a camera of the Walking Man device to the service requester terminal 200 through the application (S513).

According to an embodiment, when the Walking Man device is present in a standby state in which the service can be provided, the camera is basically activated and a camera image can be transmitted to the application (server). Thereafter, when a specific Walking Man is selected through the user device, an image obtained by the Walking Man device may be provided to the user device through the application.

The server 100 allows a user to passively view images obtained by the Walking Man device through the application if the user is a general member who is not a paid member, but activates a messenger window function in the application if the user is a paid member. The service requester may transmit a predetermined mission performance request to the Walking Man through the messenger window (S517).

Missions requested to the Walking Man include a request to change the direction of the camera of the current Walking Man device, a request to provide an image captured at a specific location beyond a predetermined radius from the current location of the Walking Man, a request to perform an additional operation by the Walking Man in addition to capturing a camera image in a specific area, and the like.

Meanwhile, the Walking Man device 400 may not accept the mission requested through the messenger window. In this case, a request rejection message of the Walking Man may be displayed on the messenger window.

Upon determining that the Walking Man has normally performed the requested mission, the server 100 may provide a predetermined point to the Walking Man (S519). According to an embodiment, the server 100 may provide different points based on obtained responsiveness information of the user after the Walking Man completes the mission.

The server 100 may manage the grade of the Walking Man based on the provided point, responsiveness information of the user, and the like after the Walking Man completes the mission (S521). When the grade of the Walking Man increases, the visual characteristics of the Walking Man graphic object provided on the map may change. Further, the Walking Man may be classified as a Walking Man representing a specific place. For example, when a Walking Man serving as a tour guide at a specific travel place is upgraded to the highest grade, the Walking Man may be displayed as a representative Walking Man when the specific travel place is displayed on a map.

Figure 6:
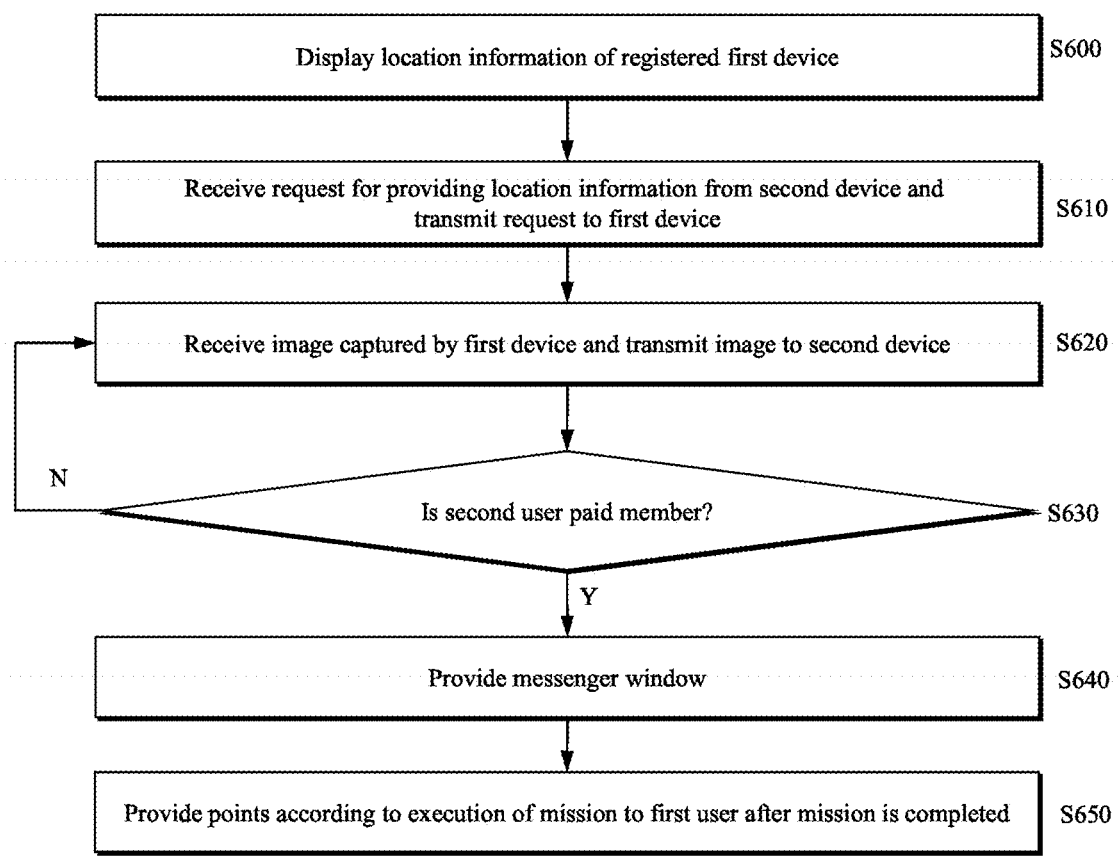
FIG. 6 is a flowchart of a location information service providing method according to an embodiment of the present disclosure.

FIG. 6 is a flowchart of a location information service providing method according to an embodiment of the present disclosure. The embodiment shown in FIG. 6 may be implemented through the controller 180 of the server described with reference to FIGS. 1 and 3. The controller 180 allows the application for providing the location-related service to be executed through a user terminal and a Walking Man device.

Referring to FIG. 6, the controller 180 of the server 100 may display location information of a registered first device on a map (S600).

Here, the first device is a device capable of providing the location based service including a location-based video service at a specific location. The first device may include at least one of a wearable device that can be worn by a first user (Walking Man), an unmanned aerial vehicle (e.g., a drone) that can be controlled by the first user, a cellular phone that can wirelessly control the wearable device and is carried by the Walking Man, and a cellular phone that can wirelessly control the unmanned aerial vehicle and is carried by the Walking Man.

The controller 180 may receive a location information provision request from a second device and transmit the request to the first device (S610). In addition, the controller 180 may receive an image captured by the first device and transmit the image to the second device (S620).

The second device may refer to a terminal of a second user who requests the location-based service. The location information provision request may include a request for providing an image captured by the Walking Man at the current location through the Walking Man device.

General members may passively receive images provided by the Walking Man. Accordingly, when a general member selects a second Walking Man at a second location after receiving an image provided through the first Walking Man at the first location, an image provided by the second Walking Man may be provided.

Upon determining that the second user is a paid member (S630: Y), the controller 180 may provide a messenger window menu on the map or activate and display the messenger window (S640).

The controller 180 may receive a request from the second user through the messenger window. The request from the second user may include a mission requested to the Walking Man. The messenger window may additionally provide interfaces such as text input and voice input.

Upon determining that the Walking Man has performed the mission requested through the messenger window, the controller 180 may provide a point according to mission performance (S650).

Figure 7:
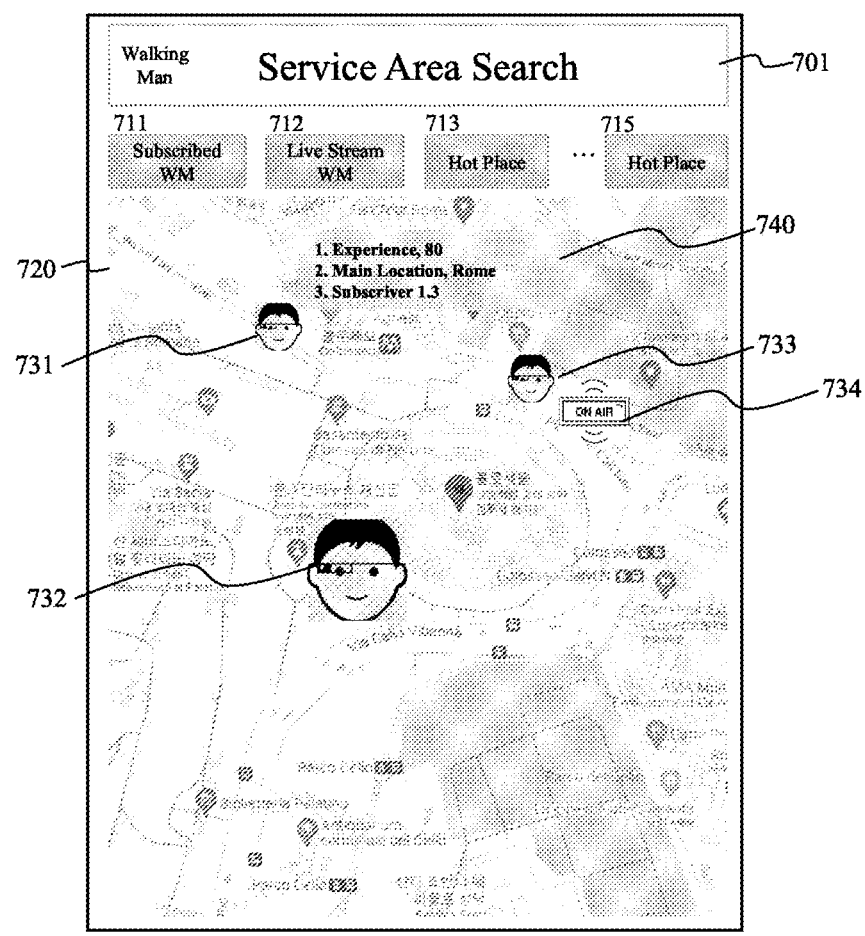
FIG. 7 shows an example of an application screen on which the location information service providing method according to an embodiment of the present disclosure is implemented.

FIG. 7 shows an example of an application screen on which the location information service providing method according to an embodiment of the present disclosure is implemented. The screen shown in FIG. 7 is an example of a screen of a service requester terminal, and the same screen may be provided on a screen of a Walking Man device. When the application is executed in the service requester terminal, a process of selecting an area where the Walking Man service will be provided through the service requester terminal may be required. Hereinafter, it is assumed that the application is implemented by the controller 180 of the server 100 described with reference to FIGS. 1 to 4. However, the application may also be implemented through the service requester terminal 200 and the Walking Man device 400.

Referring to FIG. 7, when the controller 180 executes the application providing the location information service (hereinafter referred to as an application), the controller 180 may provide an input window 701 for inputting service location information and at least one service menu 711, 712, 713, and 715 provided by the application.

When a service target location is input through the input window 701, the controller 180 may display a map 720 corresponding to the location on the display of the service requester terminal 200. Here, the controller 180 may also display information on at least one Walking Man device 731, 732, and 733 located around the selected location. For example, when the Colosseum is selected, information on Walking Man devices located around the Colosseum may be displayed. The controller 180 may search for Walking Men located within a predetermined radius (e.g., 500 meters) from the selected location and display the Walking Men.

The controller 180 may display a Walking Man devices on the map in the form of a graphic object indicating the Walking Man device. The graphic object may be displayed through a picture of a registered Walking Man, a device of a registered Walking Man, and the like. The graphic object may be displayed differently according to the grade of the Walking Man. For example, the grade of a Walking Man may be managed differentially based on at least one of the number of requests for providing location information, performed by the second user (service requester) for the first user, the number of missions requested, the number of missions performed, a degree of responsiveness of the second user according to mission performance, types of missions that can be performed by the first user (Walking Man), and difficulty levels of missions.

When a specific Walking Man graphic object is selected, the controller 180 may additionally provide information on the selected Walking Man. For example, when the first Walking Man graphic object 731 is selected, the controller 180 may provide first Walking Man information 740. The first Walking Man information 740 may include, for example, the experience of providing the Walking Man service of the first Walking Man, the main area where the Walking Man service is provided, the number of subscribers, and the like. The controller 180 may display third Walking Man information 734 when the third Walking Man graphic object 733 is selected. The third Walking Man information may include state information of the current Walking Man. As the state information of the current Walking Man, an icon indicating whether the selected Walking Man is in a state in which he/she can provide the Walking Man service may be displayed. For example, if the third Walking Man graphic object 733 is selected, an icon 734 indicating a state in which the third Walking Man is currently performing another streaming broadcast may be displayed.

Meanwhile, the Walking Man graphic objects may be displayed in such a manner that the graphic object 732 of the Walking Man that can provide the Walking Man service at a location closest to the location selected through the service requester terminal is displayed larger than other Walking Man graphic objects.

At least one service menu provided by the application may additionally provide the Walking Man information 711 to which the second user (service requester) is subscribed, the Walking Man information 712 on the Walking man who is performing the Walking Man service through live streaming at the current location on the map, hot place information 713 and 715 on the current map, and the like.

FIGS. 8 and 9 show examples in which Walking Man information according to an embodiment of the present disclosure is disclosed.

Referring to FIG. 8, the controller 180 may provide information on a Walking Man to which the second user (service requester) is subscribed. The information on the subscribed Walking Man may include a Walking Man ID, on/off state information of the current Walking Man device, information on a location where the Waling Man device is operating, the number of users accessing the Walking Man device to be provided with the Waking Man service, and the like.

Referring to FIG. 9, the controller 180 may provide information on a Walking Man currently performing live streaming at a location on a map. The information on the Walking Man performing live streaming may include a Walking Man ID, information on a location where the streaming service is currently provided, the number of users currently accessing the live streaming service, streaming video information, and the like.

Figure 10:
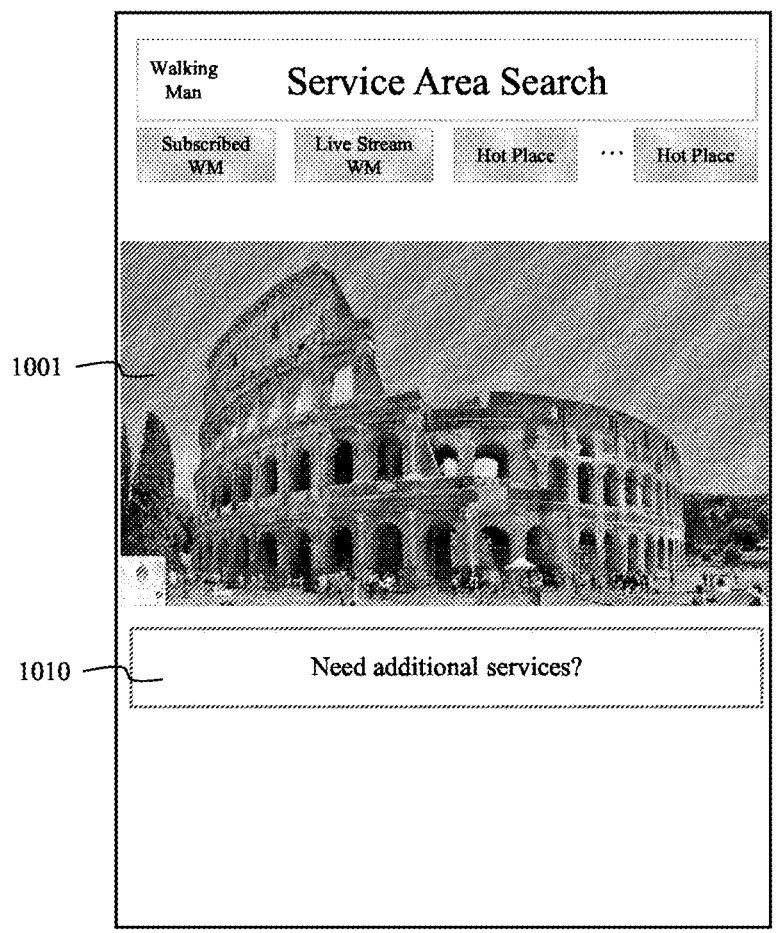
FIG. 10 shows an example of a location information provision screen according to an embodiment of the present disclosure.

FIG. 10 shows an example of a location information provision screen according to an embodiment of the present disclosure.

Referring to FIG. 10, when a specific Walking Man graphic object (e.g., the second Walking Man 732) is selected from the map shown in FIG. 7, the controller 180 may provide a second Walking Man image 1001 obtained by the camera of the second Walking Man device. The second Walking Man device may be a glasses-type terminal worn by the second Walking Man, and an image acquired in real time may be provided through the glasses-type terminal. The example shown in FIG. 10 may be location-related image information that can be provided free of charge to a Walking Man application subscriber. Accordingly, in one embodiment of the present disclosure, an additional mission may be requested from the Walking Man at the request of a user in addition to the service provided free of charge, and an additional information providing menu 1010 may be provided. When the additional information providing menu 1010 is selected, the mode can be converted to a paid mode.

In the paid mode, it is possible to request an additional mission through the Walking Man using a payment service.

Figure 11:
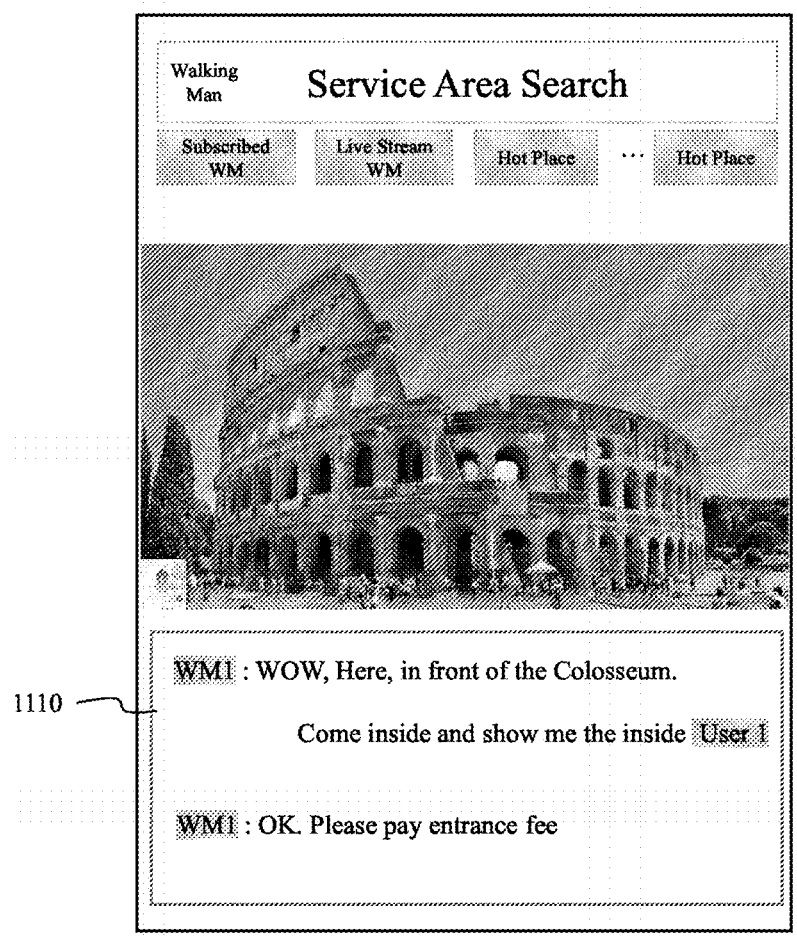
FIGS. 11 and 12 show other examples of location information provision screens according to an embodiment of the present disclosure.

FIGS. 11 and 12 show other examples of location information provision screens according to an embodiment of the present disclosure.

Referring to FIG. 11, the controller 180 may provide a messenger window 1110 through which an additional mission can be requested from a Walking Man in the paid mode or when a service requester is a paid user. For example, a service requester (e.g., User 1) may deliver a mission to the Walking Man through the messenger window 1110 to request that the Walking Man enter the Colosseum from the entrance and provide a captured image of the inside of the Colosseum. In this case, an entrance fee may be required to enter the Colosseum. In this case, the application disclosed in the present disclosure may be linked with a financial payment server such that the service requester (User 1) can pay the admission fee in real time.

In addition to message transmission and reception, the messenger window may be linked with a voice input/output interface such that the service requester and the Walking Man can communicate through voice input.

Figure 12A:
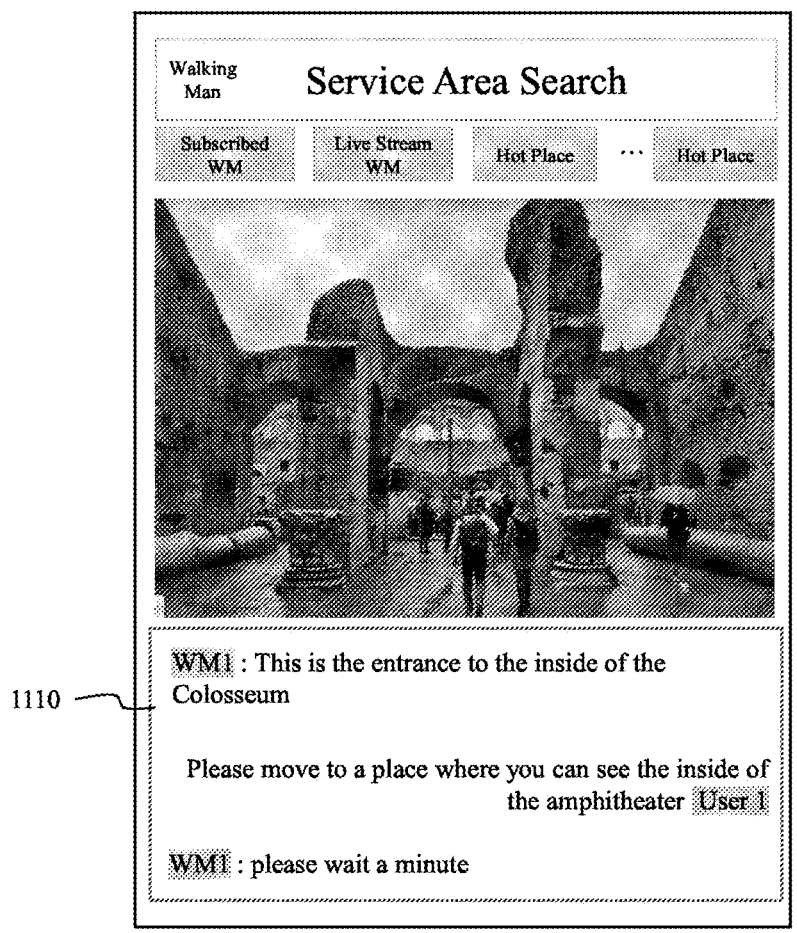
Figure 12B:
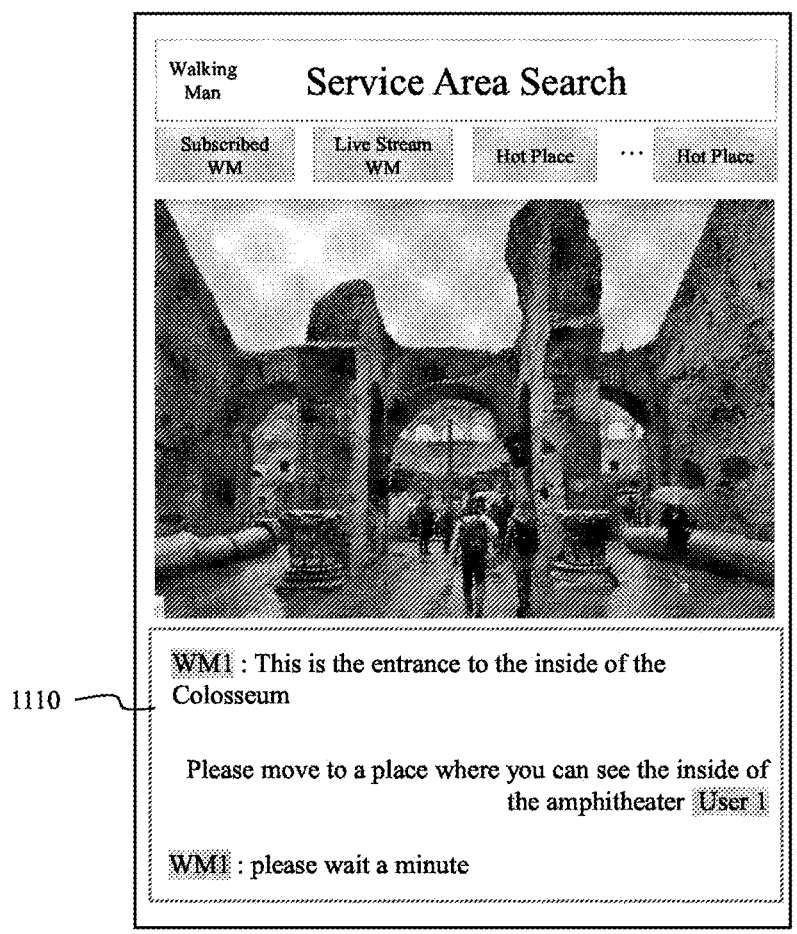

FIGS. 12A and 12B show examples of a location information service requested by a paid user to the Walking Man according to an embodiment of the present disclosure. For example, after entering the inside of the Colosseum according to the request of the service user, the Walking Man can provide streaming of images of the inside in real time. In addition, when the Walking Man receives a mission (FIG. 12A) for requesting for moving to a specific space inside the Colosseum and has normally performed the mission (FIG. 12B), the controller 180 may increase the rating score of the Walking Man in consideration of the degree of responsiveness of the service requester according to mission performance.

Figure 13:
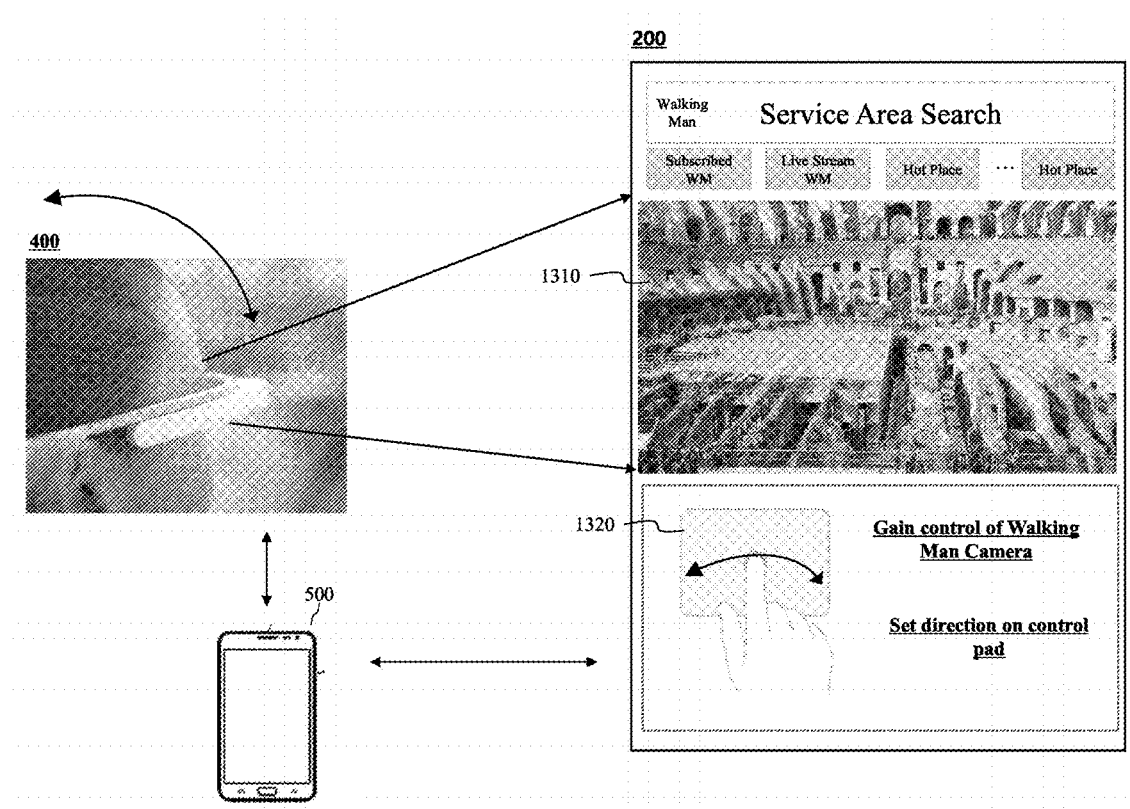
FIG. 13 shows an example of controlling a photographing direction of a Walking Man device through a user terminal according to an embodiment of the present disclosure.

FIG. 13 shows an example of controlling a photographing direction of a Walking Man device through a user terminal according to an embodiment of the present disclosure.

Referring to FIG. 13, the second user terminal 200 may receive a signal requesting control of a camera direction of a Walking Man device 400. For example, a control pad 1320 for controlling a camera direction may be provided in the messenger window, and when a touch input to the control pad 1320 is received through the second user, a camera direction control signal corresponding to the touch input may be transmitted to the Walking Man device 400. When the Walking Man device 400 is a glasses-type terminal, a direction guide indicator corresponding to the camera direction control signal may be displayed on a part of the glasses.

In addition, the second user terminal 200 may transmit the signal to a handheld terminal 500 of the Walking Man, and the handheld terminal 500 may directly control the camera direction of the glasses-type terminal 400 connected via Bluetooth, for example.

Figure 14:
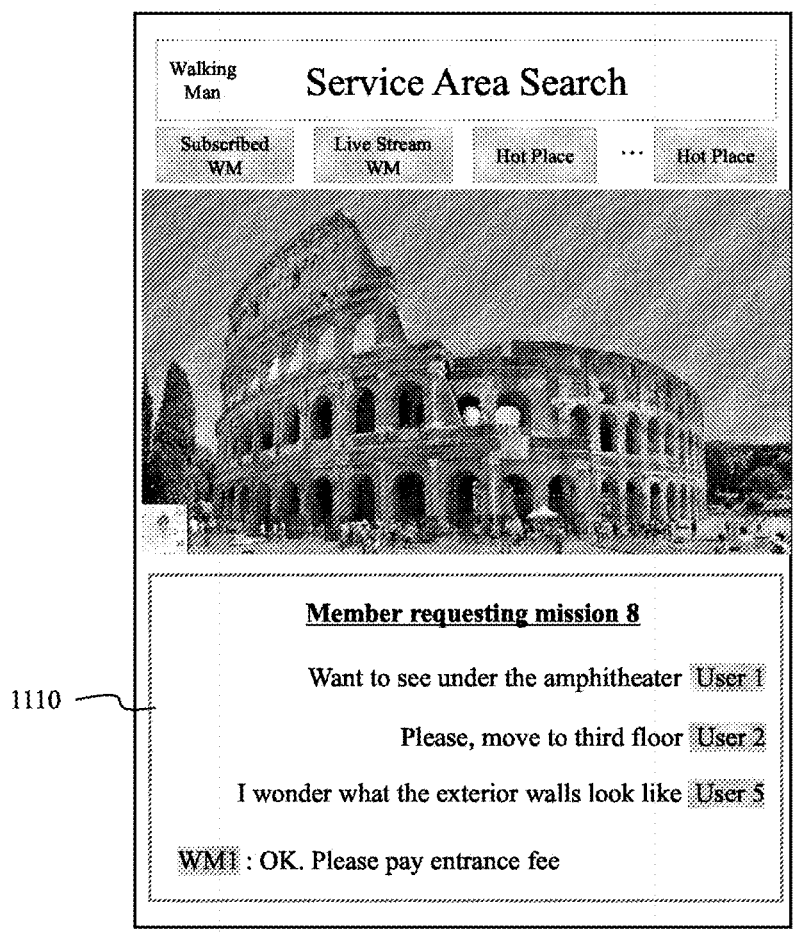
FIG. 14 shows an example of a case in which a plurality of users requests a Walking Man service according to an embodiment of the present disclosure.

FIG. 14 shows an example of a case where a plurality of users requests the Walking Man service according to an embodiment of the present disclosure.

When the number of second users requesting a predetermined mission through the messenger window exceeds a predetermined number, the controller 180 may create and display a group messenger window having a plurality of second users as participants. That is, there may be cases in which a plurality of paid users requests that the same Walking Man perform different missions. In this case, the application of the present disclosure may group the plurality of users and respond to requests of the plurality of paid users through a single messenger window because the location is the same.

When there is a plurality of mission requesters, the controller 180 may set the contents of mission requests to be public or private according to settings of the mission requesters.

In addition, the controller 180 may control the group messenger window such that the user (Walking Man) of the first device has the right to control the group messenger window. When the Walking Man has the right to control the group messenger window, the controller 180 can switch the control pad for camera direction control in the group messenger window to an inactive mode.

Figure 15:
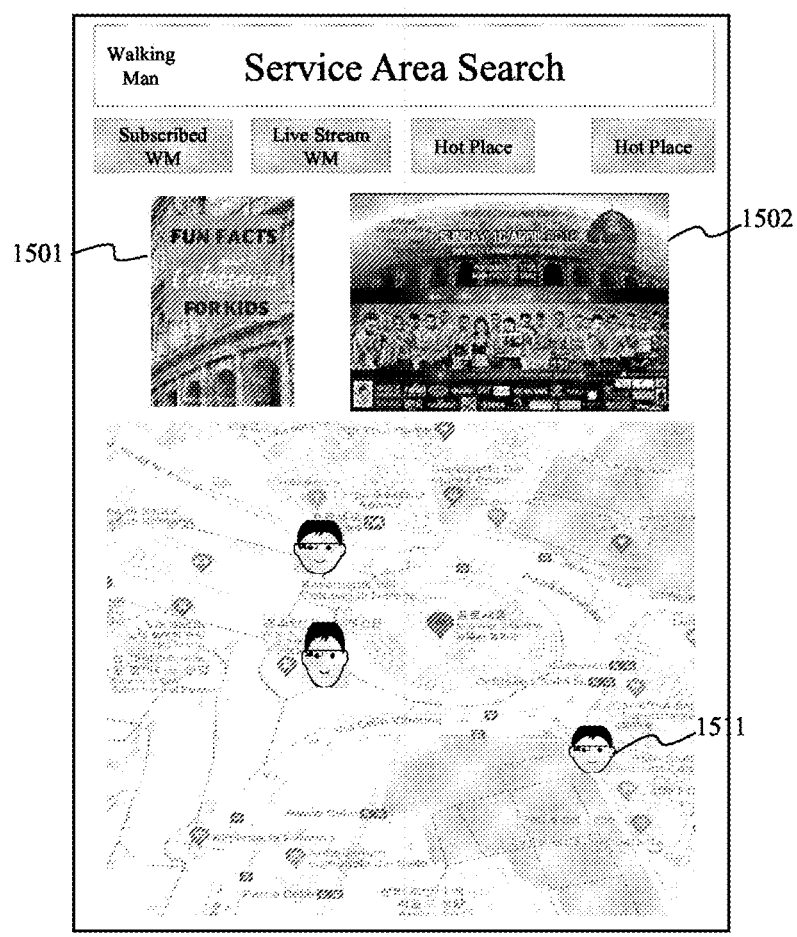
FIG. 15 shows an example in which the Walking Man service and a local advertisement service are provided together according to an embodiment of the present disclosure.

FIG. 15 shows an example in which the Walking Man service and a local advertisement service are provided together according to an embodiment of the present disclosure.

The controller 180 may provide region-based advertisement content 1501 and 1502 on the basis of the location information of the Walking Man device. In this case, when the application is started and a service requestor inputs service target area information, advertisement content of the target area may be provided together with a map of the target area.

Meanwhile, the controller 180 may perform control such that different types of content are provided depending on the grade of the Walking Man and whether the service request user is a paid member.

The controller 180 may provide advertisement content of a higher advertisement cost as the grade of the Walking Man 1511 appearing on the map increases. In addition, the controller 180 may provide the advertisement content along with the Walking Man service when the Walking Man provides the Walking Man service through a real-time streaming video.

Since Walking Man service content provided through an embodiment of the present disclosure includes location-based video content, content requiring protection of personal information may be included in randomly captured images. For example, if the face of a person is included in an image, the controller 180 may perform control such that the face is automatically blurred and transmitted to a service requester terminal.

In the present disclosure, one or more of a Walking Man device, a user terminal, and a server may be linked to an artificial intelligence module, a robot, an augmented reality (AR) device, a virtual reality (VT) device, a device related to 5G service, and the like.

Figure 16A:
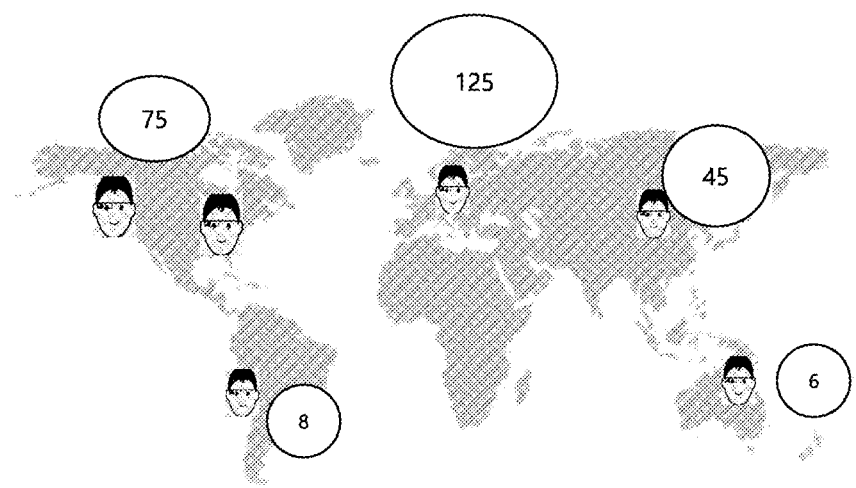
FIGS. 16A and 16B show examples of execution screens of applications in which a method for providing location information service according to an embodiment of the present disclosure.
Figure 16B:
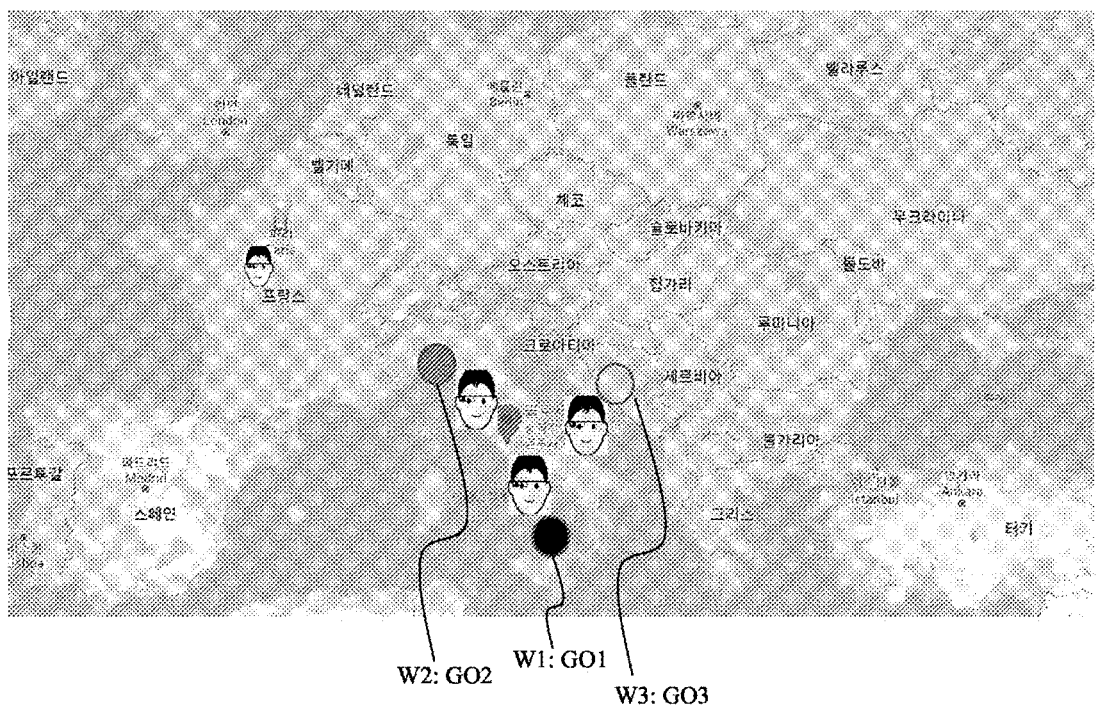

FIGS. 16A and 16B show examples of execution screens of applications in which a method for providing location information service according to an embodiment of the present disclosure.

A detailed description of the shape of the graphic object indicating the Walking Man device has been described with reference to FIG. 7. In the case of FIG. 7, when a specific area is selected through an input interface, an example in which a Walking Man capable of providing the Walking Man service in the specific area is started through a predetermined Walking Man graphic object has been described. However, according to one embodiment of the present disclosure, when the application is executed, the currently active Working Man may be displayed on the global map data before any specific region is selected. According to an embodiment, the application may display a predetermined graphic object (eg, a symbol of a different color depending on the amount of traffic) on the global map data so as to distinguish the amount of traffic of the currently active Working Man. can be displayed the amount of traffic of the Workingman may be distinguished by differently displaying at least one of the color, size, and shape of the graphic object.

Referring to FIG. 16A, as the application is executed, the controller 180 may map the distribution of active working man, including real-time streaming broadcasting, to global map data and display the map on the display unit. The distribution of Workingmen may mean the number of active Workingmen for each location. The locations may be classified according to global continents. Accordingly, the user can check the location where the Walking Man activity is active.

According to one embodiment, when receiving an input for selecting a Walking Man graphic object active in continental Europe in FIG. 16A, the controller 180, as shown in the example of FIG. It can be displayed together with predetermined graphic objects (GO1, GO2, GO3) indicating the quantity. Here, the first graphic object GO1 corresponding to the first Walking Man device W1 may have a different color characteristic from the third graphic object GO3 corresponding to the third Walking Man device W3. Traffic volume of one Walking Man device W1 is greater than that of the third Walking Man device W3, and may be displayed separately through the graphic objects GO1 and GO3.

The present disclosure described above can be implemented as computer-readable codes on a medium in which a program is recorded. The computer-readable medium includes all kinds of recording devices in which data readable by a computer system is stored. Examples of the computer-readable medium include a hard disk drive (HDD), a solid state disk (SSD), a silicon disk drive (SDD), ROM, RAM, CD-ROM, a magnetic tape, a floppy disk, and an optical data storage device, and other implementations in the form of carrier waves (e.g., transmission over the Internet). Therefore, the above detailed description should not be construed as limited in all respects but should be considered as exemplary. The scope of the present disclosure should be determined by reasonable interpretation of the appended claims, and all changes within the equivalent scope of the present disclosure are contained in the scope of the present disclosure.

What is claimed is:

1. A method of providing a location information service through an application for location information service provision, comprising:
   displaying location information of a registered first device on a map;
   transmitting a request for providing location information to the first device through a wireless communication unit when the request for providing location information is received through the first device from a second user of a second device through the wireless communication unit;
   receiving an image captured by the first device through the wireless communication unit and transmitting the image to the second device;
   providing a messenger window for requesting a predetermined mission to a first user of the first device when the second user is a paid member of the application; and
   providing points according to execution of the mission to the first user upon determining that the mission has been performed in response to the request of the second user.

2. The method of claim 1, wherein the first device includes at least one of a wearable device wearable by the first user, an unmanned aerial vehicle controllable by the first user, a portable terminal of the first user capable of wirelessly controlling the wearable device, and a portable terminal of the first user capable of wirelessly controlling the unmanned aerial vehicle.

3. The method of claim 1, wherein the displaying of the location information of the first device on the map comprises:
   searching for at least one first device matching a location on a map displayed on a display of the second device; and
   displaying a graphic object capable of indicating each of the at least one first device on the map.

4. The method of claim 3, further comprising differentially managing a grade of the first user through a database on the basis of at least one of a number of requests for providing the location information from the first user, a number of times the mission is requested, a number of times the mission is performed, a degree of responsiveness of the second user according to execution of the mission, types of missions that are able to be performed by the first user, and a difficulty level,
   wherein the graphic object is changed according to the grade of the first user.

5. The method of claim 3, wherein a standby state is displayed through the graphic object when the first device is performing the predetermined mission in response to a request of the paid member.

6. The method of claim 1, further comprising transmitting an alarm to the first device and a first user terminal capable of wirelessly controlling the first device when acknowledgement for the request for providing location information is not received from the first device within a predetermined time.

7. The method of claim 1, wherein the displaying of the location information of the first device on the map comprises displaying the location information of the first device on the map if the first device is registered in a standby state for providing the location information service at a specific location before the specific location is displayed through the map.

8. The method of claim 1, further comprising generating and displaying a group messenger window having a plurality of second users as participants when the number of second users requesting the predetermined mission through the messenger window exceeds a predetermined number,
   wherein the user of the first device has the right to control the group messenger window.

9. The method of claim 1, further comprising extracting and blurring a face area of a person if an object included in the image captured by the first device is the person.

10. The method of claim 1, further comprising controlling region-based advertisement content to be displayed on the display of the second device based on the location information of the first device.

11. The method of claim 10, wherein the advertisement content is changed according to the grade of the first user and whether or not the second user is a paid member.

12. The method of claim 1, wherein the messenger window includes a control right setting menu for the first device,
   further comprising granting a control right to control a camera direction of the first device to the second user through an input signal applied to the control right setting menu; and transmitting a camera control signal for controlling the camera direction of the first device to the first device based on a touch signal input to the display of the second device.

* * * * *